Figure 1:
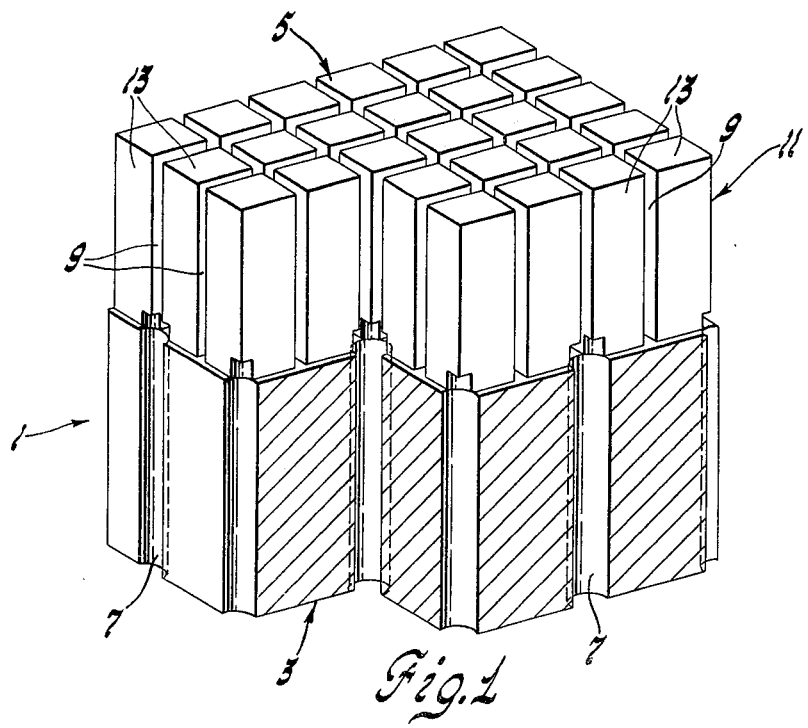

United States Patent [19]

Reed

[11] 4,235,583
[45] Nov. 25, 1980

[54] EXTRUSION DIE AND METHOD FOR MAKING SAME

[75] Inventor: James R. Reed, Flint, Mich.

[73] Assignee: General Motors Corporation, Detroit, Mich.

[21] Appl. No.: 889,358

[22] Filed: Mar. 23, 1978

[51] Int. Cl.³ .............................................. B29F 3/04
[52] U.S. Cl. ...................................... 425/464; 29/460; 29/527.2; 76/107 R; 264/36; 425/467; 428/933; 428/936
[58] Field of Search ............ 76/107 R; 425/464, 467, 425/461; 29/527.2, 460; 264/36; 428/933, 936, 937

[56] References Cited

U.S. PATENT DOCUMENTS

| | | | |
|---|---|---|---|
| 1,310,509 | 7/1919 | Specht | 425/464 |
| 1,817,680 | 8/1931 | Pratt | 76/107 A |
| 1,944,758 | 1/1934 | Roux | 76/107 A |
| 2,412,698 | 12/1946 | Horst | 29/527.2 |
| 2,494,970 | 1/1950 | Shea | 425/461 |
| 2,532,283 | 12/1950 | Brenner et al. | 426/461 |
| 2,588,421 | 3/1952 | Shepard | 428/937 |
| 2,882,759 | 4/1959 | Altwicker | 76/107 A |
| 2,997,783 | 8/1961 | Crehan et al. | 428/939 |
| 3,038,420 | 6/1962 | Immohr | 425/331 |
| 3,156,950 | 11/1964 | Walton | 76/107 S |
| 3,174,183 | 3/1965 | Siegel | 76/107 S |
| 3,251,316 | 5/1966 | Forth | 425/464 |
| 3,339,588 | 9/1967 | Nilles | 428/437 |
| 3,373,751 | 3/1968 | Wallberg | 425/464 |
| 3,433,049 | 3/1969 | Naeser et al. | 72/467 |
| 3,566,642 | 3/1971 | Whitacre | 76/107 R |
| 3,606,665 | 9/1971 | Glucoft | 425/461 |
| 3,824,196 | 7/1974 | Benbow | 425/461 |
| 3,837,783 | 9/1974 | Bagley | 425/464 |
| 3,877,272 | 4/1975 | Brunosson | 428/684 |
| 3,905,743 | 9/1975 | Bagley | 425/464 |
| 3,938,925 | 2/1976 | Lees | 425/464 |
| 4,118,456 | 10/1978 | Blanding et al. | 425/464 |

FOREIGN PATENT DOCUMENTS 222190  9/1924  United Kingdom ................ 76/107 R Primary Examiner—Jay H. Woo
Attorney, Agent, or Firm—Sidney Carter

[57] ABSTRACT

A method is provided for forming an extrusion die of the type used to form a ceramic monolith having thin walls defining a multiplicity of parallel tubular passageways with at least about 100 passageways per square inch, the die having a feed face and a discharge face, the feed face having a plurality of feed holes extending partially through said die and interconnecting with a network of grid slots in the discharge portion of said die formed by a plurality of grid pins which define the slot width and the wall thickness, shape and size of said passageways. The method involves the steps of forming the width of the slots larger than the desired wall thickness of the passageways, and metal plating the slot defining surfaces of the grid pins to obtain the slot width corresponding to the desired wall thickness. Plating is accomplished by the electroless plating technique using a metal selected from the group consisting of nickel, chromium, cobalt and cobalt-nickel. The resulting die has a substantially uniform coating of wear resistant metal which is strippable for replating and continued die use.

6 Claims, 2 Drawing Figures

U.S. Patent  Nov. 25, 1980  4,235,583

EXTRUSION DIE AND METHOD FOR MAKING SAME

This invention relates to the art of extruding a ceramic monolith having at least about 100 thin walled passageways per square inch. More particularly, this invention relates to an improved extrusion die structure and to the method for making such die.

As is disclosed in the U.S. patent to Benbow, U.S. Pat. No. 3,824,196 issued July 16, 1974, it is well known in the art to form a refractory ceramic thin wall monolith by the extrusion of a ceramic composition through a die having feed channels interconnecting in the die with a plurality of intersecting slots which are patterned so as to form the tubular passageways in the monolith with the desired shape, size, and density per unit area. Such thin walled ceramic honeycomb structures have been used as catalyst supports, filters, heat exchangers and the like. However, the manufacture of such dies is costly in view of the fact that the slots through which the composition is extruded to form the thin walled tubular structure are very narrow and may well be in the range of from 0.002 to about 0.050 inch. Also, the walls of the die, commonly made of steel, tend to be subject to rapid wear under the high pressures of extrusion and the abrading effect of the fine ceramic particles in the composition being extruded. It is current practice in the art to replace the die once the slots have been so worn as to form wall sections which are thicker than desired.

In accordance with my invention, it is no longer necessary to discard such dies and the slot dimensions may be reconstructed to permit continued use.

More particularly, the method of my invention involves the steps of cutting or otherwise forming the slots in the extrusion or forming end of the die larger than the desired wall thickness of the passageways in the extruded monolith, this being followed by electroless metal plating of the slot defining surfaces of the grid pins to obtain the slot width corresponding to the desired wall thickness. The cutting or formation of wider slots allows a wider choice of fabricating methods thus enabling the use of less critical and time consuming techniques while at the same time enabling the fabrication of finished slots narrower than heretofore reasonably achievable. The use of a plating metal such as nickel, chromium, cobalt or cobalt-nickel enables the achievement of a hard wear resistant surface which has been found to lower extrusion pressures and permits the use of less expensive basic die materials. Additionally, the method of my invention results in a metal coating which, on reaching the point of excessive wear, may be stripped and replated to restore the die to the original desired slot width thus making possible the limitless extension of the life of the die.

By way of a prior art statement, reference is made to the U.S. Pat. No. to Shea 2,494,970 issued Jan. 17, 1950 and that to Glucoft U.S. Pat. No. 3,606,665 issued Sept. 21, 1971. The patent to Shea discloses a method for reconditioning forging dies in which the die cavity is machined or hogged out to remove excessively worn or cracked portions of the die material, the enlarged cavity being then filled in by electro-welding, followed by remachining to reform the die cavity to the desired dimensions and shape.

The U.S. patent to Glucoft discloses a method of restoring worn brake surfaces by using an electric arc spraying gun for melting steel and copper and spraying the molten metal in a finely divided state onto the braking surfaces to build up the wall thickness. Machining of the built up surfaces is performed as necessary to obtain a smooth uniform thickness.

While each of the patents discloses a technique for building up a basic metal structure to a desired thickness, neither discloses or anticipates the build up of the surfaces of a complex die body formed of a plurality of closely spaced apart grid pins where opposing surfaces to be built up face each other across a narrow gap such as from about 0.010 to about 0.018 inches, this in addition to other significant distinctions disclosed and claimed here following such as electroless plating the coating metal.

It is therefore an object of my invention to provide a method for forming an extrusion die by using oversize slots and coating the adjacent and closely spaced apart wall surfaces of slot defining extrusion die grid pins with a wear resistant metal to obtain desired slot width. It is a further object of my invention to provide a method for obtaining a metal coating on the slot defining surfaces of die grid pins narrowly spaced apart from each other by electroless metal plating. Additionally, it is an object of my invention to provide an extrusion die wherein the slot defining surfaces of the extrusion grid pins are very closely spaced apart and have a metal plating which, upon excessive wear, may be stripped from the base metal and may be replated to the desired thickness for continued die use. These and other objects of my invention will be apparent from the description which follows and from the drawings in which FIG. 1 shows an isometric section of a portion of the die embodying the principles of my invention, and FIG. 2 shows a plan view of a cross section through a portion of the grid pins forming the extrusion portion of the die.

Having reference to FIG. 1, an extrusion die 1 is provided with a feed face 3 and a discharge face 5, the feed face having a plurality of feed holes or passages 7 extending partially through the die and interconnecting with a network of slots 9 which are cut or otherwise formed in the extrusion grid portion 11 of the die. As shown in FIG. 1, the slots 9 are formed of two series of slots, each slot within a series being parallel to each of the others in the series and perpendicular to the parallel slots in the other series. The parallel and perpendicular slots form a plurality of grid pins 13 which, by their spacing and shape, define the slot width and therefore the wall thickness, shape and size of the passageways in the extruded ceramic monolith. While I have shown the grid pins 13 as square in cross section and therefore producing a plurality of parallel square tubes in the extruded monolith, such pins may be formed in any desired shape such as triangular, circular, elliptical, etc. Similarly, while I have shown the feed holes or passages 7 to be interconnected with the slots at alternate intersections of the slots 9, other desirable configurations may be used such as interconnecting at each intersection or at points in the slots between intersections.

Figure 2:
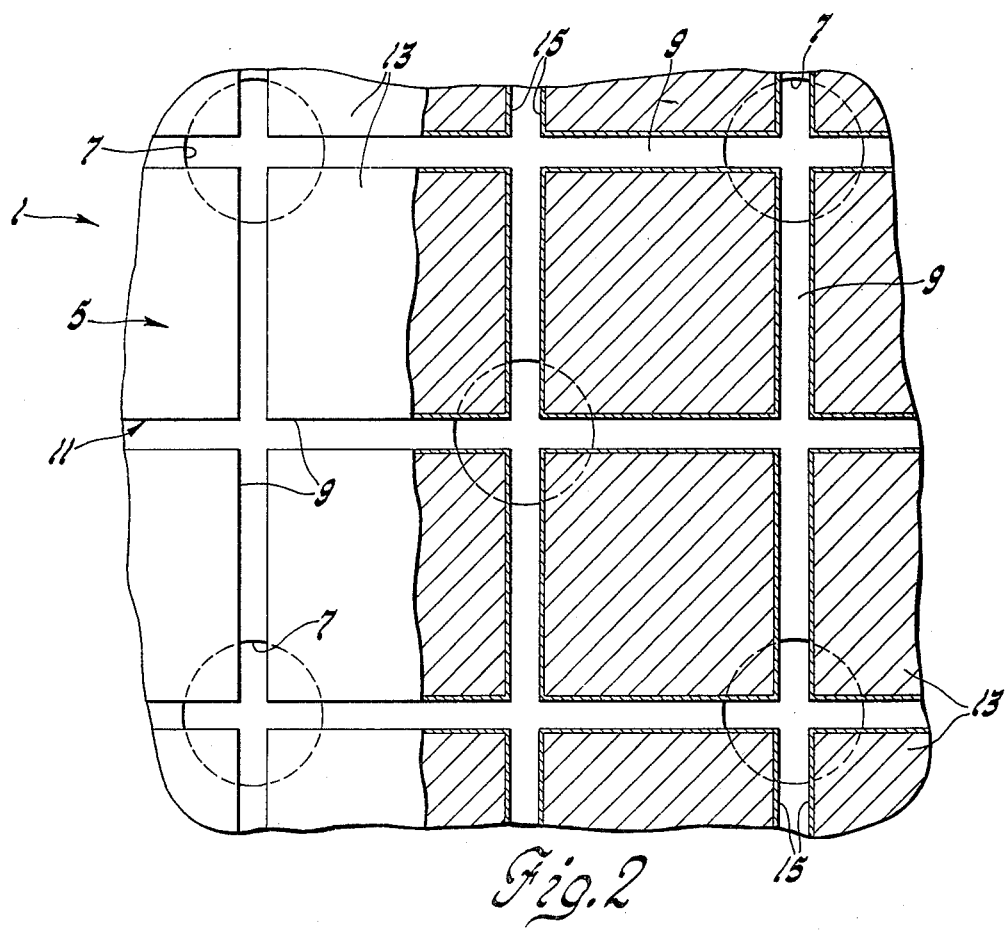

As shown more clearly in FIG. 2, each of the grid pins 13 is provided with a surface coating 15 formed by the electroless plating on the base die material of a wear resistant metal such as nickel, chromium, cobalt and cobalt-nickel. I have found that the hypophosphite reduction process of the plating metal ion, e.g., nickel, as shown in U.S. Pat. No. 2,532,283, Brenner et al, issued Dec. 5, 1950, produces a substantially uniform, smooth coating on the pin surfaces defining the gap. Other electroless plating techniques known in the art may also be used, it being only necessary that the resulting coating be substantially uniform and smooth. Similarly, any of the desired techniques available in the art for cutting the metal block to form the extrusion grid portion may be used. Since my invention enables the build up of the slots 9 cut into the die material by electroless plating, the slots may be cut wider than that determined by the desired monolith wall thickness thus enabling the selection of less expensive and critically controlled forming techniques. Techniques available include electrical discharge machining, wire cutting, milling, wheel grinding, laser and electron beam cutting. In addition to simplifying the die machining operations, the use of a plated metal coating applied by electroless plating techniques can extend die life indefinitely. More particularly, the coating may be stripped from the base metal of the die when excessive wear of the coating has taken place, the coating being then replated to achieve the original dimensions of the grid slots.

Although grid slots as wide as 0.050 inch have been in use and wider slots will present no difficulty in fabrication, the use of narrower slots has recently come into common use with respect to the extrusion of ceramic monolith supports for use in catalytic converters in order to reduce the mass of ceramic material and thus enable more rapid light-off of the catalyst. Thus, while electrical discharge machining has been used to produce slots of 0.012-0.014 inch, difficulty was experienced in machining slots of 0.010 width and less. In accordance with my invention, electroless nickel plating the walls of an oversize slot has successfully reduced the width from 0.014 to 0.006 inch. In this regard, reductions of slot width to as small as about 0.004 are possible by my technique. Further, the hardness of the nickel deposited was raised to about a Rockwell C-60 by heat treatment. While other plating metals may be applied as noted herein, we prefer to use nickel. Extrusion test runs referred to hereinafter used such nickel plated dies. Die samples used in such tests to determine feasibility of plating and extrudability are shown in TABLE I, the slots having been cut in the die block by electrical discharge machining as the preferred technique. As shown in TABLE I, electroless metal build-up on the slot surfaces has been as thick as 0.004" on each opposing slot surface, Sample 6. Metal build-up as much as about 0.005" and greater is possible with electroless metal plating techniques.

TABLE I

| Die Sample | 1 | 2 | 3 | 4 | 5 | 6 |
|---|---|---|---|---|---|---|
| Grid Dimensions | | | | | | |
| passageways/in.$^2$ | 178 | 178 | 300 | 300 | 178 | 300 |
| shape | sq. | sq. | sq. | sq. | sq. | sq. |
| slot width - inches | | | | | | |
| unplated | 0.014 | 0.018 | 0.010 | 0.014 | 0.012 | 0.014 |
| plated | 0.010 | 0.012 | 0.007 | 0.010 | 0.010 | 0.006 |

Electroless nickel plating using hypophosphite reduction as described above was accomplished without problem and the nickel plating was both uniform and smooth. Die Sample No. 2 has been used to extrude approximately 5,000 monolith parts without any sign of wear on the coating. Similar results were obtained with respect to Sample No. 4 which was used as a screen in the preparation of the material composition for extrusion. The composition for extrusion is as disclosed in U.S. Pat. No. 3,954,672 issued May 4, 1976 to Arthur V. Somers et al covering cordierite refractory compositions. Because of the relatively narrow slot width of Samples Nos. 3 and 6, 0.007 and 0.006", respectively, some difficulty was encountered in the extrusion. However, it should be understood that the narrower the slot width, the greater the need for adjustment of extrusion pressure and the lubricity and density of the material being extruded, necessary adjustments being readily determined by simple testing. In this regard, it has been found that the nickel plated die has a reduced friction effect resulting in relatively rapid extrusion and good wear characteristics, presumably due to reduced pressure and hardened surfaces.

TABLE II shows comparative testing results using nickel plated dies and dies whose surface has been treated to form a titanium carbide coating by vapor reaction of titanium with the high carbon steel of the base die material, a D-2 steel being used for the die. The grid dimensions of the dies are 178 passageways per square inch, the grid slots being 0.012 inch wide.

TABLE II

| Part | Coating | Auger - RPM | Pressure | Rate |
|---|---|---|---|---|
| 3.66 Dia. | nickel | 30 | 920 psi | 223 in/min |
|  | TiC | 30 | 980 | 132 |
| 5.7 × 3.2 | nickel | 30 | 720 | 171 |
| oval | TiC | 20 | 820 | 108 |

It will be seen from the data that even at significantly lower extrusion pressures, the extrusion rate for the nickel plated die was substantially greater than that for the titanium carbide-faced die. This lower pressure and more rapid extrusion obviously has the potential for significant savings in energy. Likewise, since the base die material is coated with nickel, the base die material may be selected to improve machinability, strength, or other characteristics and results.

From the foregoing description it will be apparent that by my invention I have provided an extrusion die and a method for forming such die which lends itself to indefinite life, substantial economies in use, and the advantage of wide flexibility in choice of fabricating process. It is possible that modifications to my invention will be apparent to those skilled in the art from such description and it is intended that such modifications be within the scope of my invention as covered by the claims which follow.

The embodiments of the invention in which an exclusive property or privilege is claimed are defined as follows:

1. In a method for forming an extrusion die of the type used to form a ceramic monolith having thin walls defining a multiplicity of parallel tubular passageways with at least about 100 passageways per square inch, said die having a feed face and a discharge face, said feed face having a plurality of feed holes extending partially through said die and interconnecting with a network of grid slots in the discharge portion of said die formed by a plurality of grid pins which define the said slot width and the wall thickness, shape and size of said passageways, the invention comprising the steps of forming the width of said slots larger than the desired wall thickness of said monolith passageways, and metal plating the slot defining surfaces of said grid pins to obtain the slot width corresponding to said desired wall thickness, said plating being accomplished by electroless plating of a metal selected from the group consisting of nickel, chromium, cobalt and cobalt-nickel, to form a substantially uniform coating having good wear resistance and being strippable for replating and continued die use.

2. In a method as set forth in claim 1, the metal being nickel.

3. In a method as set forth in claim 1, said plated slot width being as small as about 0.004 inches.

4. In a metal extrusion die for forming a thin wall ceramic monolith having at least 100 passageways per square inch, wherein said die is provided with a feed face and a discharge face, said feed face having a plurality of feed holes extending partially through said die and interconnecting with a network of grid slots in the discharge portion of said die formed by a plurality of closely spaced apart grid pins defining the slot width and the wall thickness, shape and size of said passageways, the improvement comprising the slot defining surfaces of said pins having a coating of an electroless plated metal selected from the group consisting of nickel, chromium, cobalt and cobalt-nickel, said coating being wear resistant and removable for enabling replating and continued die use.

5. A die in accordance with claim 4, the metal being nickel.

6. A die in accordance with claim 4, the slot width being as small as about 0.004 inches.

* * * * *